US012803905B2

(12) United States Patent
Xiao

(10) Patent No.: US 12,803,905 B2
(45) Date of Patent: Nov. 17, 2026

(54) IN-SITU FLOW INFORMATION TELEMETRY METHOD, ENCAPSULATION NODE, TELEMETRY NODE, AND COMPUTER-READABLE MEDIUM

(71) Applicant: ZTE Corporation, Shenzhen (CN)

(72) Inventor: Min Xiao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 43 days.

(21) Appl. No.: 19/076,694

(22) Filed: Mar. 11, 2025

(65) Prior Publication Data

US 2025/0211522 A1 Jun. 26, 2025

Related U.S. Application Data

(63) Continuation of application No. PCT/CN2023/116732, filed on Sep. 4, 2023.

(30) Foreign Application Priority Data

Sep. 15, 2022 (CN) ......................... 202211123195.X

(51) Int. Cl.
*H04L 45/50* (2022.01)
*H04L 43/08* (2022.01)
*H04L 45/12* (2022.01)

(52) U.S. Cl.
CPC .............. *H04L 45/50* (2013.01); *H04L 43/08* (2013.01); *H04L 45/123* (2013.01); *H04L 2212/00* (2013.01)

(58) Field of Classification Search
None
See application file for complete search history.

(56) References Cited

U.S. PATENT DOCUMENTS 7,243,161 B1 7/2007 Tappan et al.
11,979,317 B2 * 5/2024 Rajamanickam ....... H04L 45/42
(Continued)

FOREIGN PATENT DOCUMENTS

CN 113079091 A 7/2021
CN 113328901 A 8/2021
(Continued)

OTHER PUBLICATIONS

European Search Report issued in EP Patent Application No. 23864590.7, dated Nov. 17, 2025, 9 pages.
(Continued)

*Primary Examiner* — Boris D Grijalva Lobos
(74) *Attorney, Agent, or Firm* — Ashurst Perkins Coie US LLP

(57) ABSTRACT

Provided in the present disclosure is an in-situ flow information telemetry method. The method is used for an encapsulation node of an MPLS network, and the method comprises: encapsulating a telemetry indication label and a telemetry information label in a label stack of an MPLS message, wherein the telemetry indication label is used for indicating the telemetry information label in the label stack; and the telemetry information label is used for indicating a telemetry type and telemetry information of in-situ flow information telemetry which needs to be performed, and the length of the telemetry information corresponds to the telemetry type. Further provided in the present disclosure are an in-situ flow information telemetry method for a telemetry node of an MPLS network, and an encapsulation node, a telemetry node and a computer-readable medium.

22 Claims, 4 Drawing Sheets

(56) References Cited

U.S. PATENT DOCUMENTS

| | | | | |
|---|---|---|---|---|
| 2010/0085974 | A1 | 4/2010 | Miyabe | |
| 2020/0162375 | A1* | 5/2020 | Chen | H04L 41/5009 |
| 2021/0135986 | A1* | 5/2021 | Song | H04L 45/50 |
| 2022/0337497 | A1* | 10/2022 | Huang | H01M 4/13 |
| 2023/0031423 | A1* | 2/2023 | Gandhi | H04L 45/123 |

FOREIGN PATENT DOCUMENTS

| | | | | |
|---|---|---|---|---|
| CN | 113556259 | A | 10/2021 | |
| CN | 113949650 | A | 1/2022 | |
| WO | WO-2022132208 | A1 * | 6/2022 | H04L 43/10 |

OTHER PUBLICATIONS

Tan et al., "In-band Network Telemetry: A Survey," Computer Networks, Elsevier, Amsterdam, NL, vol. 186, Dec. 26, 2020, XP086466074, 20 pages.

International Search Report and Written Opinion issued in International Patent Application No. PCT/CN2023/116732, dated Oct. 16, 2023, 9 pages. English translation included.

* cited by examiner

IN-SITU FLOW INFORMATION TELEMETRY METHOD, ENCAPSULATION NODE, TELEMETRY NODE, AND COMPUTER-READABLE MEDIUM

CROSS-REFERENCE TO RELATED APPLICATIONS

This application is a continuation of International Patent Application No. PCT/CN2023/116732, filed Sep. 4, 2023, which claims priority from Chinese Patent Application No. 202211123195.X, filed Sep. 15, 2022, the content of each which is hereby incorporated by reference in its entirety.

FIELD

The present application relates to the field of communications, in particular to an in-situ flow information telemetry method, an encapsulation node, a telemetry node, and a computer-readable medium.

BACKGROUND

In-situ flow information telemetry is an important function of a data communication network, i.e., a service packet directly carries in-situ flow information telemetry information such that each node in the path can directly perform telemetry based on the in-situ flow information telemetry information, to obtain performance indicators such as latency, packet loss, jitter, and the like of network. The in-situ flow information telemetry function can be applied to various data communication networks such as an Internet Protocol Version 6 (IPv6) network, a Multi-Protocol Label Switching (MPLS) network, and the like.

However, for the MPLS network, the method of encapsulating in-situ flow information telemetry information into MPLS packets according to the related technologies are not satisfactory, which lacks a unified rule for the nodes in the path to process the in-situ flow information telemetry information, thus increasing the processing difficulty while reducing the processing efficiency.

SUMMARY

According to the present disclosure, there are provided an in-situ flow information telemetry method, an encapsulation node, a telemetry node, and a computer-readable medium.

In a first aspect, embodiments of the present disclosure provide an in-situ flow information telemetry method for an encapsulation node in an MPLS network, comprising: encapsulating a telemetry indication label and a telemetry information label into a label stack of an MPLS packet; wherein the telemetry indication label is used to indicate the telemetry information label in the label stack, the telemetry information label is used to indicate a telemetry type and telemetry information of in-situ flow information telemetry to be performed, and a length of the telemetry information corresponds to the telemetry type.

In a second aspect, embodiments of the present disclosure provide an in-situ flow information telemetry method for a telemetry node in an MPLS network, comprising: parsing a label stack of a received MPLS packet; in response to the label stack comprising a telemetry indication label, determining a telemetry information label in the label stack based on the telemetry indication label, wherein the telemetry indication label is used to indicate the telemetry information label in the label stack, the telemetry information label is used to indicate a telemetry type and telemetry information of in-situ flow information telemetry to be performed, and a length of the telemetry information corresponds to the telemetry type; determining, based on the telemetry information label, a telemetry type and telemetry information of in-situ flow information telemetry to be performed; and performing the in-situ flow information telemetry based on the telemetry type and the telemetry information.

In a third aspect, embodiments of the present disclosure provide an encapsulation node applied to an MPLS network, comprising: one or more memories, and one or more processors; wherein the memory(ies) stores a computer program executable by the processor(s), and the method of in-situ flow information telemetry of any of the embodiments of the present disclosure is implemented when the computer program is executed by the processor(s).

In a fourth aspect, embodiments of the present disclosure provide a telemetry node applied to an MPLS network, comprising: one or more memories, and one or more processors; wherein the memory(ies) stores a computer program executable by the processor(s), and the method of in-situ flow information telemetry of any of the embodiments of the present disclosure is implemented when the computer program is executed by the processor(s).

In a fifth aspect, embodiments of the present disclosure provide a computer readable medium having a computer program stored thereon, wherein the method of in-situ flow information telemetry of any of the embodiments of the present disclosure is implemented when the computer program is executed by a processor.

BRIEF DESCRIPTION OF THE DRAWINGS

In the drawings according to embodiments of the present disclosure.

DETAILED DESCRIPTION OF EMBODIMENTS

Figure 1:
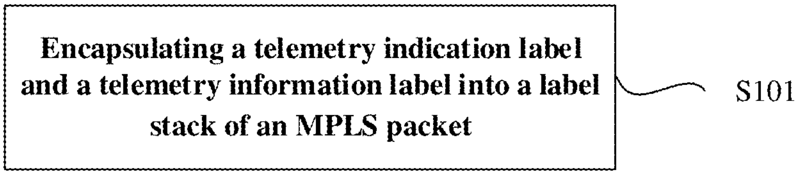
FIG. 1 illustrates a flowchart of an in-situ flow information telemetry method for an encapsulation node in an MPLS network according to embodiments of the present disclosure.

In order to enable those skilled in the art to better understand the technical solution of the present disclosure, reference will be made to the drawings to describe below in detail the in-situ flow information telemetry method, the encapsulation node, the telemetry node, and the computer-readable medium according to the embodiments of the present disclosure.

More details of the present disclosure will be described below with reference to the drawings, but the embodiments as shown may be embodied in various forms and should not be construed as being limited to the embodiments described herein. Rather, those embodiments are provided to make the present disclosure thorough and complete, and intended to enable those skilled in the art to fully understand the scope of the present disclosure.

The drawings are provided for further understanding on the embodiments of the present disclosure, and formulate a part of the Description to explain the present disclosure in conjunction with the detailed embodiments, without suggesting any limitation to the present disclosure. Through description of the detailed embodiments with reference to the drawings, the above and other features and advantages will be made more obvious to those skilled in the art.

The embodiments of the present disclosure can be described with reference to plans and/or cross-sectional views with the aid of idealized schematic diagrams of the present disclosure. Accordingly, the exemplary drawings may be modified according to manufacturing techniques and/or tolerances.

The embodiments of the present disclosure and the various features therein can be combined with each other if there is no conflict.

The terms used herein are merely used to describe specific embodiments, and are not intended to limit the present disclosure. The term "and/or" used herein includes any and all combinations of one or more of the associated listed items. As used herein, "a" and "the" which indicate a singular form are intended to include a plural form, unless expressly stated in the context. It should be further understood that the term(s) "comprise" and/or "be made of" used herein indicate(s) the presence of the described features, integers, operations, elements and/or components, but do not exclude the presence or addition of one or more other features, integers, operations, elements, components and/or combinations thereof.

Unless indicated otherwise, all terms (including technical and scientific terms) used herein have the same meaning as commonly understood by those of ordinary skill in the art. It should be further understood that terms, such as those defined in commonly used dictionaries, should be interpreted as having a meaning that is consistent with a meaning in the context of the related technology and the background of the present disclosure, and should not be interpreted in an idealized or overly formal sense unless clearly indicated herein.

The present disclosure includes modifications to configuration formed based on a manufacturing process, rather than being limited to those illustrated in the drawings. Thus, regions shown in the drawings are illustrative, and shapes of the regions shown in the drawings show specific shapes of regions of elements, without suggesting any limitation.

According to some related technologies, the common in-situ flow information telemetry includes an Alternate Marking type, and an In situ Operations, Administration, and Maintenance type, wherein the Alternate Marking type is defined in the standard RFC 8321 published by the International Organization for Standardization IETF (Internet Engineering Task Force), and the In-situ Operations, Administration, and Maintenance type is defined in the standard RFC 9197 and the draft standard draft-ietf-ippm-ioam-direct-export-10.

The in-situ flow information telemetry information required in the in-situ flow information telemetry of the Alternate Marking type has a fixed length. For example, for a Multi-Protocol Label Switching (MPLS) network, the draft standard draft-ietf-mpls-inband-pm-encapsulation-03 published by the IETF specifies the manner of the in-situ flow information telemetry of the Alternate Marking type, and also requires that the fixed length of the in-situ flow information telemetry information be 23 bits.

The in-situ flow information telemetry information required in the in-situ flow information telemetry of the In situ Operations, Administration, and Maintenance type includes multiple types of data options, wherein some data options have a fixed length while some other data options have a variable length. For the MPLS network, the standard draft draft-gandhi-mpls-ioam-05 published by the IETF specifies the manner of the in-situ flow information telemetry of the In situ Operations, Administration, and Maintenance type. For example, in the standard draft draft-ietf-ippm-ioam-direct-export-10 published by the IETF, it is defined that: the fixed length of the Direct Export (DEX) data option is 40 bits, including 16 bits of Namespace-ID, and 24 bits of IOAM-Trace-Type; the DEX data option indicates that the intermediate forwarding node and the decapsulation node directly transmit the detection (or also referred to as telemetry) information of the present node to a telemetry information analyzer, while other data options indicate that the intermediate forwarding node and the decapsulation node add the telemetry information of the present node to the service packet, and the decapsulation node collectively transmits the telemetry information to the telemetry information analyzer.

In some related technologies, for the MPLS network, the in-situ flow information telemetry information of the Alternate Marking type is encapsulated in the label stack of the MPLS packet, and a guide label (a label with a special value) is used to indicate a presence of the in-situ flow information telemetry information of the Alternate Marking type; the in-situ flow information telemetry information of the In situ Operations, Administration, and Maintenance type is set in an extension header after the label stack (the in-situ flow information telemetry information of this type have an unfixed length that may be variable, and therefore cannot be place in the label stack), and a further guide label is used to indicate presence of the in-situ flow information telemetry information of the In situ Operations, Administration, and Maintenance type.

As can be seen, according to the aforementioned manner of encapsulating in-situ flow information telemetry information into an MPLS packet, there is no unified rule for the nodes in the MPLS network to process the in-situ flow information telemetry information, which increases the processing difficulty while reducing the processing efficiency.

In view of the above technical problem, in the first aspect, the embodiments of the present disclosure provide an in-situ flow information telemetry method for an encapsulation node in an MPLS network.

The method according to the embodiments of the present disclosure is applied to an MPLS network to implement in-situ flow information telemetry, which is performed by an encapsulation node for encapsulating and transmitting a packet (a service packet) in the MPLS network. The encapsulation node encapsulates in-situ flow information telemetry information in a packet according to the method of the embodiments of the present disclosure, so as to enable telemetry nodes (including an intermediate forwarding node and a decapsulation node) that receive the packet thereafter to perform in-situ flow information telemetry based on the in-situ flow information telemetry information therein.

It would be appreciated that the encapsulation node and the telemetry node in the embodiments of the present disclosure are defined according to their roles in one packet transmission process, while the respective nodes in the MPLS network may have a capability of playing different roles at the same time (i.e., each node may act as an encapsulation node or a telemetry node in different packet transmission processes).

Referring to FIG. 1, the in-situ flow information telemetry method according to the embodiments of the present disclosure includes: in step S101, encapsulating a telemetry indication label and a telemetry information label into a label stack of an MPLS packet.

Wherein, the telemetry indication label is used to indicate the telemetry information label in the label stack, the telemetry information label is used to indicate a telemetry type and telemetry information of in-situ flow information telemetry to be performed, and a length of the telemetry information corresponds to the telemetry type.

In the embodiments of the present disclosure, the encapsulation node determines a content of an MPLS packet (a service packet) to be transmitted, performs packet encapsulation accordingly to obtain the MPLS packet, and then transmits the MPLS packet correspondingly. In the encapsulation process, the encapsulation node is also required to encapsulate the telemetry indication label and the telemetry information label in the label stack (the MPLS label stack) of the MPLS packet.

Wherein, the telemetry indication label is used to indicate a telemetry information label (i.e., a "presence" of a telemetry information label in the label stack), and a specific location of the telemetry information label in the label stack. The telemetry information label is used to indicate a telemetry type and telemetry information of in-situ flow information telemetry to be performed. The telemetry type is used to specify what type of in-situ flow information telemetry is required, wherein an optional telemetry type includes, for example, the Alternate Marking type or the In situ Operations, Administration, and Maintenance type, as described above, or the like. In addition, the telemetry information is specific information of in-situ flow information telemetry, i.e., the telemetry node needs to determine, based on the content of the telemetry information, how to perform the in-situ flow information telemetry.

Wherein, for each telemetry type, the telemetry information corresponding thereto has a fixed length (of course, telemetry information of a different telemetry type is varied in specific length value). Therefore, based on the telemetry type of the telemetry information label, the telemetry node can directly determine the telemetry information in the telemetry information label.

It would be appreciated that, if multiple types of in-situ flow information telemetry are to be performed, a plurality of telemetry information labels should be included in the label stack to respectively indicate different telemetry types and telemetry information.

According to embodiments of the present disclosure, in the label stack of the MPLS packet, the telemetry indication label is used to indicate a presence of in-situ flow information telemetry information, and the telemetry information label is used to indicate a specific telemetry type and specific telemetry information. Therefore, the respective types of in-situ flow information telemetry information can be collectively encapsulated in the label stack such that the MPLS network nodes can adopt a unified rule to parse and process the MPLS packet, thus reducing the processing difficulty while improving the efficiency; moreover, the number of telemetry indication labels will not be increased with the increase of the types of in-situ flow information telemetry, which can save the scarce label resources and reduce the depth of the label stack; meanwhile, since the length of the telemetry information is fixed (of course, the specific length value may be varied for different telemetry types), the process of extracting and parsing the telemetry information can be further simplified.

In some implementations, the telemetry indication label and the telemetry information label can be set consecutively; the telemetry indication label includes a guide label and a length label, wherein the guide label includes a guide identifier for indicating a presence of a telemetry information label in the label stack, and the length label includes a length identifier for indicating a total length of the telemetry information label in the label stack.

In some implementations, the telemetry information label can be set directly after the telemetry indication label.

In some implementations, the telemetry indication label includes two labels, namely a guide label and a length label, which may be set in such a manner that the guide label precedes the length label. Wherein, the guide identifier in the guide label is used to indicate a "presence" of a telemetry information label in the label stack, which can be embodied in various forms. For example, the guide label may be an MPLS label with a specific value of, for example, 10 (i.e., the guide identifier=10). The length identifier of the length label may be used to indicate a total length of the telemetry information label in the label stack, which can be embodied in various forms. For example, the value of the length identifier may be "a number" of the telemetry information labels, "a number of bits" occupied, or the like.

As such, based on whether the label stack of the MPLS packet includes a guide label, the telemetry node can determine whether in-situ flow information telemetry is to be performed. If it is determined to perform the in-situ flow information telemetry, the length label is further parsed to obtain the length of the telemetry information label, such that the content of the corresponding length after the telemetry indication label is determined as the telemetry information label, and those telemetry information labels are parsed to obtain the telemetry type and the telemetry information, to enable the in-situ flow information telemetry.

In some implementations, the telemetry information label includes a first telemetry information label; the first telemetry information label includes a type identifier and first telemetry information; wherein, the type identifier is used to indicate a telemetry type; a length of the first telemetry information corresponds to the type identifier in the first telemetry information label.

In some implementations, a form of the telemetry information label is a first telemetry information label, and each first telemetry information label includes a type identifier and first telemetry information. Wherein, the type identifier is used to determine a type of the in-situ flow information telemetry to be performed, and can be embodied in various forms. For example, the type identifier may be a type field of the first telemetry information label header, wherein a different value of the type field corresponds to a different telemetry type. The first telemetry information is specific information required by the in-situ flow information telemetry of the type described above; as the length of the telemetry information corresponds to the telemetry type, the length of the first telemetry information in the first telemetry information label can also be determined based on the type identifier therein. For example, if the type identifier characterizes that the in-situ flow information telemetry is of the Alternate Marking type, the length of the corresponding first telemetry information may be 23 bits; if the type identifier characterizes that the in-situ flow information telemetry is of the In situ Operations, Administration, and Maintenance type, the length of the corresponding first telemetry information may be 40 bits.

In some implementations, the telemetry information label may include a second telemetry information label corresponding to at least part of the first telemetry information label; wherein, the second telemetry information label is located after the first telemetry information label corresponding thereto; the second telemetry information label includes second telemetry information, and a length of the second telemetry information corresponds to the type identifier in the first telemetry information label to which the second telemetry information label corresponds.

In some implementations, in some cases, the total length of the telemetry information may be greater than a maximum length allowed by the first telemetry information label. For such first telemetry information label, a second telemetry information label may be set thereafter, wherein the second telemetry information may include telemetry information (second telemetry information) only, without the "type identifier," and the length of the second telemetry information corresponds to the type identifier in the corresponding first telemetry information label. Therefore, for a certain type of in-situ flow information telemetry, the telemetry information thereof can be jointly represented by first telemetry information and second telemetry information. It would be appreciated that the respective lengths of the first telemetry information and the second telemetry information correspond to the telemetry type, but the specific length values thereof may be different from each other.

Figure 2:
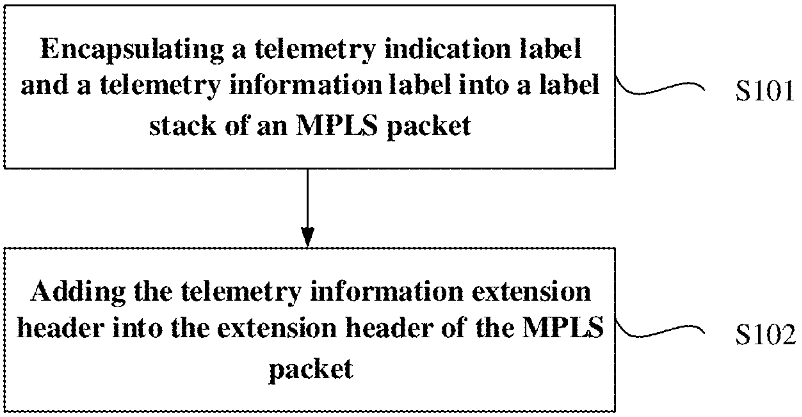
FIG. 2 illustrates a flowchart of a further in-situ flow information telemetry method for an encapsulation node in an MPLS network according to embodiments of the present disclosure.

In some implementations, the telemetry indication label further includes a telemetry extension header identifier; wherein, the telemetry extension header identifier is used to indicate that the MPLS packet includes a telemetry information extension header that includes additional telemetry information; referring to FIG. 2, the method according to the embodiments of the present disclosure may include: in step S102, adding the telemetry information extension header into the extension header of the MPLS packet.

Information required by some types of in-situ flow detection information telemetry may include length-variable portions (e.g. a part of data options of the in-situ flow information telemetry of the In situ Operations, Administration, and Maintenance type), and those portions cannot be added into the label stack.

In the case, the length-variable information can be set, as additional telemetry information, into the telemetry information extension header, and the telemetry information extension header is then added into the extension header located after the label stack. Correspondingly, it is required that telemetry extension header identifier be included in the telemetry indication label, to indicate a presence of a telemetry information extension header in the MPLS packet.

In some implementations, the telemetry indication label and the telemetry information label are set consecutively; the telemetry indication label includes a guide label and a length label; wherein, the guide label includes a guide identifier for indicating a presence of a telemetry information label in the label stack; the length label includes a length identifier for indicating a total length of the telemetry information label in the label stack; the telemetry extension header is located in the length label.

It would be appreciated that the additional telemetry information is not telemetry information in the telemetry information label, but is located in the extension header, and therefore, the length of the additional detection information does not need to correspond to the telemetry type and is thus variable.

In some implementations, the telemetry extension header identifier may be located in the length label, i.e., in addition to the total length of the telemetry information label, the length label can also indicate a presence of a telemetry information extension header in the MPLS packet.

It would be appreciated that the specific form of the telemetry extension header identifier is not limited to the above examples, which can be any form as long as it can be determined, based on the telemetry indication label, whether a telemetry information extension header is included in the MPLS packet.

It would be appreciated that in addition to the telemetry information extension header described above, the extension header of the MPLS packet may also include other types of extension headers, such as an MPLS extension header for characterizing other information.

It would be appreciated that in addition to the telemetry indication label and the telemetry information label described above, the label stack may also include other types of labels, such as an MPLS forwarding label, and the like.

It would be appreciated that in addition to the respective contents mentioned above, the labels of the label stack may include other contents. For example, each of the labels may include an "S identifier," wherein the value 1 thereof represents that the label is located on the stack bottom while 0 represents that the label is not on the stack bottom.

It would be appreciated that in addition to the label stack and the extension stack described above, the MPLS packet may also include other contents.

In a second aspect, the embodiments of the present disclosure provide an in-situ flow information telemetry method for a telemetry node in an MPLS network.

The method according to embodiments of the present disclosure is applied to an MPLS network to implement in-situ flow information telemetry, which is specifically performed by a telemetry node that receives a packet (a service packet) in the MPLS network i.e., the telemetry node processes the received packet (the packet encapsulated and transmitted for the first time by the encapsulation node) according to the method of the embodiments of the present disclosure, to implement in-situ flow information telemetry.

Wherein, the telemetry node can continue to forward the packet to other nodes, i.e., it can be an intermediate forwarding node; alternatively, the telemetry node can decapsulate and process the packet, i.e., it can act as a decapsulation node (i.e., a target node).

It would be appreciated that the encapsulation node and the telemetry node in the embodiments of the present disclosure are defined according to their roles in a packet transmission process, and the respective nodes in the MPLS network are capable of simultaneously playing different roles, i.e., each node can act as an encapsulation node or a telemetry node in different packet transmission processes.

Figure 3:
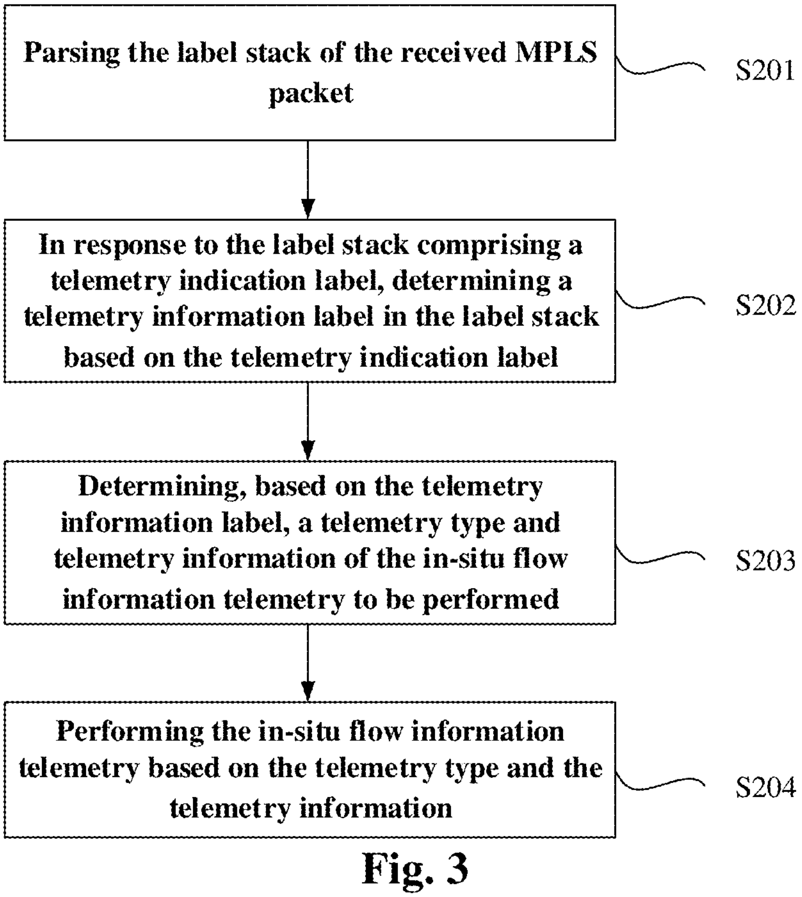
FIG. 3 illustrates a flowchart of an in-situ flow information telemetry method for a telemetry node in an MPLS network according to embodiments of the present disclosure.

Referring to FIG. 3, the in-situ flow information telemetry method according to the embodiments of the present disclosure includes steps S201 through S204.

In step S201, parsing the label stack of the received MPLS packet.

In step S202, in response to the label stack comprising a telemetry indication label, determining a telemetry information label in the label stack based on the telemetry indication label.

Wherein, the telemetry indication label is used to indicate the telemetry information label in the label stack; the telemetry information label is used to indicate a telemetry type and telemetry information of in-situ flow information telemetry to be performed, and a length of the telemetry information corresponds to the telemetry type.

In step S203, determining, based on the telemetry information label, a telemetry type and telemetry information of the in-situ flow information telemetry to be performed.

In step S204, performing the in-situ flow information telemetry based on the telemetry type and the telemetry information.

In this embodiment, after receiving the MPLS packet transmitted by the encapsulation node, the telemetry node parses the label stack thereof; if the label stack includes the telemetry indication label described above, it is indicated that the in-situ flow information telemetry needs to be performed; accordingly, the telemetry node further determines the telemetry information label in the label stack based on the telemetry indication label, parses the telemetry information label to determine the telemetry type and the telemetry information of the in-situ flow information telemetry, and then performs the in-situ flow information telemetry based on the telemetry type and the telemetry information.

According to the embodiments of the present disclosure, the various types of in-situ flow information telemetry information can be collectively encapsulated in the label stack such that the MPLS network nodes can adopt a unified rule to parse and process the MPLS packet, thus reducing the processing difficulty while improving the efficiency; moreover, the number of detection indication labels will not be increased with the increase of the types of in-situ flow information telemetry, which can save the scarce label resources and reduce the depth of the label stack; meanwhile, since the length of the telemetry information is fixed, the process of extracting and parsing the telemetry information can be further simplified.

In some implementations, the telemetry type includes an Alternate Marking type and/or an In situ Operations, Administration, and Maintenance type.

In some implementations, the specific types of the in-situ flow information telemetry performed by the telemetry node may include an Alternate Marking type, an In situ Operations, Administration, and Maintenance type, and the like.

It would be appreciated that, if the label stack does not include a telemetry indication label, it is indicated that there is no need to perform in-situ flow information telemetry, and the MPLS packet can be processed in the conventional way.

Figure 4:
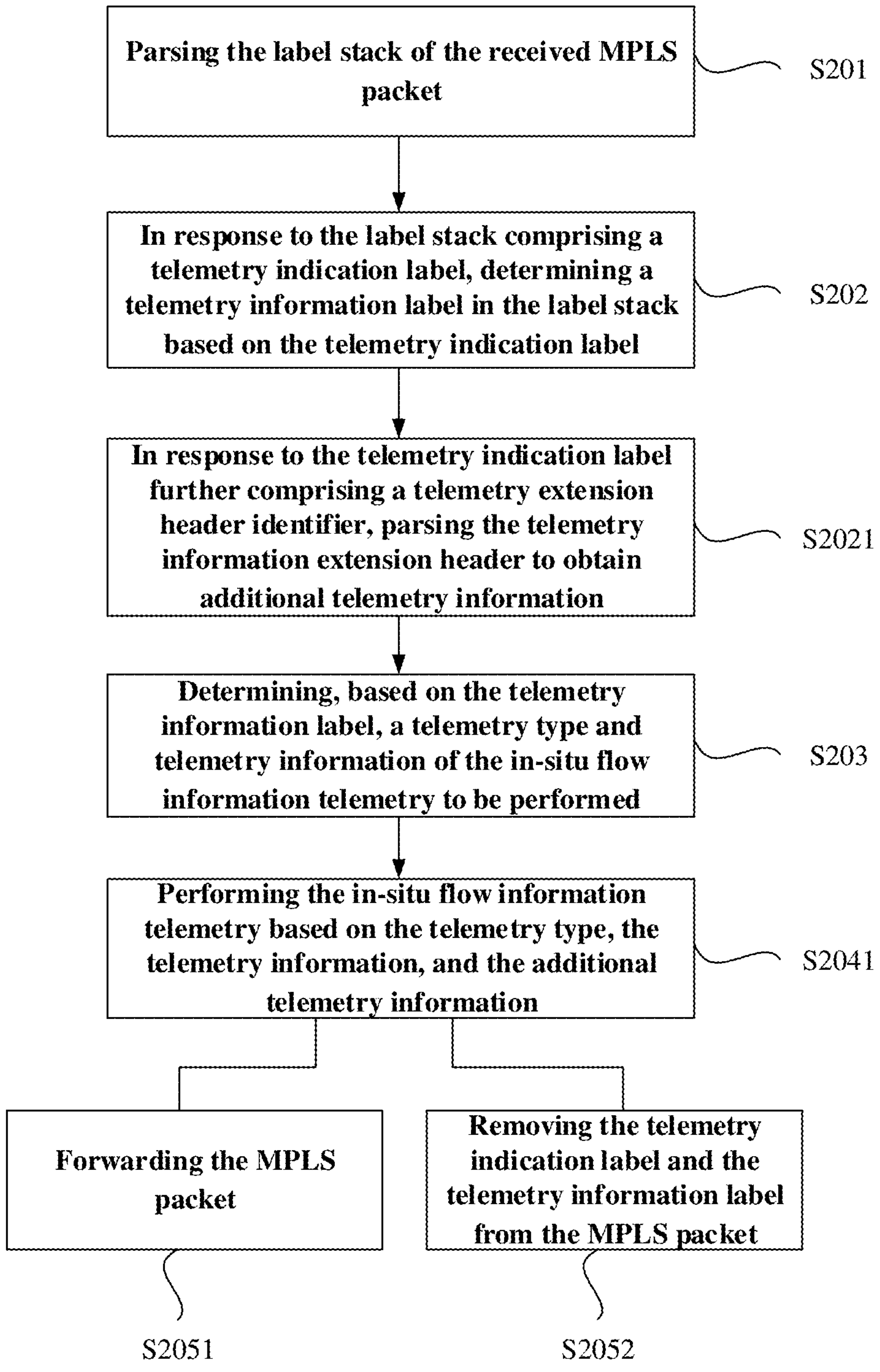
FIG. 4 illustrates a flowchart of a further in-situ flow information telemetry method for a telemetry node in an MPLS network according to embodiments of the present disclosure.

In some implementations, referring to FIG. 4, the method according to the embodiments of the present disclosure may also include: in step S2021, in response to the telemetry indication label further comprising a telemetry extension header identifier, parsing the telemetry information extension header to obtain additional telemetry information.

Wherein, the telemetry extension header identifier is used to indicate that the MPLS packet includes a telemetry information extension header including additional telemetry information.

In some implementations, performing the in-situ flow information telemetry (S204) based on the telemetry type and the telemetry information includes: step S2041, performing the in-situ flow information telemetry based on the telemetry type, the telemetry information, and the additional telemetry information.

In some implementations, when the telemetry node obtains, through parsing, a presence of a telemetry extension header identifier in the telemetry indication label, it is indicated that the MPLS packet further includes the telemetry information extension header, the additional telemetry information can thus be obtained by further parsing the telemetry information extension header, and based on the telemetry type and all the in-situ flow information telemetry information (the telemetry information and the additional telemetry information), it is determined how to perform the in-situ flow information telemetry.

It would be appreciated that, if a telemetry information extension header is included, the telemetry node only needs to find the telemetry indication label and the telemetry extension header identifier, and obtain corresponding information respectively from the telemetry information label and the telemetry information extension header, so as to perform the in-situ flow information telemetry. Therefore, the sequential numbers and the description order of the above steps are not provided to limit the execution order thereof.

In some implementations, referring to FIG. 4, the method according to the embodiments of the present disclosure further includes: in step S2051, forwarding the MPLS packet.

In some implementations, in addition to performing the in-situ flow information telemetry, the telemetry node can also forward the MPLS packet to the following node, i.e., the telemetry node may be an intermediate forwarding node only for forwarding the MPLS packet.

In some implementations, referring to FIG. 4, the method according to the embodiments of the present disclosure further includes: in step S2052, removing the telemetry indication label and the telemetry information label from the MPLS packet.

In some implementations, the telemetry node can remove the telemetry indication label and the telemetry information label from the MPLS packet, and then process the MPLS packet after the removal (the in-situ flow information telemetry is performed not for the MPLS packet per se), i.e., the telemetry node may be a decapsulation node (or referred to as target node) for actually processing the MPLS packet.

It would be appreciated that the telemetry node only needs to perform the process of forwarding or removing the MPLS packet and the in-situ flow information telemetry process, as required. It is not required that the respective steps therein be performed in a specific order.

It would be appreciated that the specific operation of the telemetry node according to the embodiments of the present disclosure corresponds to the decapsulation process of the decapsulation node described above. For example, the telemetry indication label therein may also include a guide label and a length label, and the telemetry information label may also include a first telemetry information label, a second telemetry information label, and the like. Details thereof are omitted herein.

Figure 5:
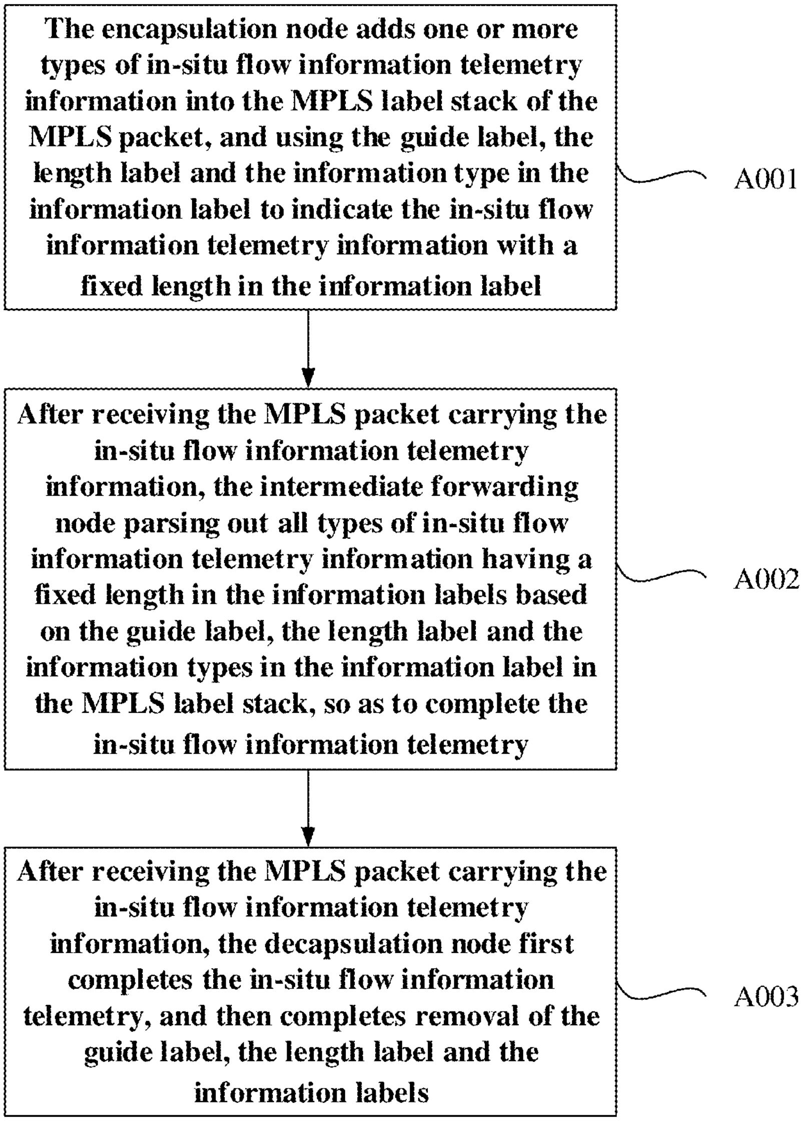
FIG. 5 illustrates a flowchart of an in-situ flow information telemetry method according to embodiments of the present disclosure.

Hereinafter, an in-situ flow information telemetry method according to the embodiments of the present disclosure will be described in detail. Referring to FIG. 5, the method includes the following steps of A001 through A005.

In step A001, the encapsulation node adds one or more types of in-situ flow information telemetry information (i.e., telemetry information) into the MPLS label stack (i.e., label stack) of the MPLS packet, and the guide label, the length label and the information type (i.e., the telemetry type) in the information label (i.e., the telemetry information label) is used to indicate the in-situ flow information telemetry information with a fixed length in the information label.

In some implementations, the encapsulation node uses a guide label (including a guide identifier) to indicate a presence of in-situ flow information telemetry information. Following the guide label, a length label is used (including a length identifier) to indicate a total length of the information label. Following the length label, a type filed (i.e., a type identifier) is used to indicate a presence of a specific type of in-situ flow information telemetry information. Following the type field, in-situ flow information telemetry information of this type having a fixed length is filled. If there are multiple types of in-situ flow information telemetry information, a further type field is used subsequently to indicate a presence of a further type of in-situ flow information telemetry information, and in-situ flow information telemetry information of this type having a fixed length is then filled, and so on. For in-situ flow information telemetry information with multiple types of data options (i.e., in-situ flow information telemetry information of the In situ Operations, Administration, and Maintenance type), in order to accomplish the purpose of using in-situ flow information telemetry information with a fixed length, the most common and valuable data option with a fixed length can be selected from the multiple types of data options, and set in the MPLS label stack as the in-situ flow information telemetry information, so as to facilitate parsing and processing of the MPLS network node. Then, the encapsulation node sends the encapsulated MPLS packet.

In step A002, after receiving the MPLS packet carrying the in-situ flow information telemetry information, the intermediate forwarding node (i.e., a telemetry node) parsing out all types of in-situ flow information telemetry information having a fixed length in the information labels based on the guide label, the length label and the information types in the information label in the MPLS label stack, so as to complete the in-situ flow information telemetry.

In some implementations, by scanning the MPLS label stack, the intermediate forwarding node first finds the guide label and the length label thereafter, and then extracts one or more information labels immediately following the length label; subsequently, determines, based on the type fields in the respective information labels, the length of the following in-situ flow information telemetry information, extracts each piece of in-situ flow information telemetry information, and completes the corresponding in-situ flow information telemetry. Then, the intermediate forwarding node forwards the MPLS packet (probably forwards to other intermediate forwarding node, or to the decapsulation node).

In step A003, after receiving the MPLS packet carrying the in-situ flow information telemetry information, the decapsulation node (i.e., a telemetry node) first completes the in-situ flow information telemetry, and then completes removal of the guide label, the length label and the information labels.

In some implementations, the decapsulation node first extracts all the in-situ flow information telemetry information and completes all the in-situ flow information telemetry in a similar way to the intermediate forwarding node, then determines the positions and the number of the information labels based on the guide label and the length label, and removes the guide label, the length label and the information labels from the MPLS packet. Subsequently, the decapsulation node decapsulates the MPLS packet, and performs the required processing thereon.

Example 1

As a specific example of the embodiments of the present disclosure, an in-situ flow information telemetry method according to Example 1 of the present disclosure may include the following steps A101 through A103.

In step A101, the decapsulation node adds in-situ flow information telemetry information of the Alternate Marking type into the MPLS label stack of the MPLS packet, and uses the guide label, the length label and the information type in the information label to indicate the in-situ flow information telemetry information of the Alternate Marking type having a fixed length in the information label.

In this example, as shown in Table 1, the MPLS packet includes two portions, namely an MPLS label stack and an MPLS payoff.

The MPLS label stack consists of a set of 32-bit MPLS labels.

Wherein, the information type and the in-situ flow information telemetry information of the Alternate Marking type form an MPLS label (also referred to as information label), wherein the 8-bit information type is used to indicate that the following is 23-bit in-situ flow information telemetry information of the Alternate Marking type, and the 23 bits includes 15 bits in the preceding, and 8 bits in the following (with an S bit inserted therebetween).

The two MPLS labels before the information label are a guide label and a length label, respectively.

The value 10 of the first 20 bits of the guide label is a special MPLS label value, which is used to indicate that the following are a length label and one or more information labels. The length label has a length value to indicate a length of the following information (in this example, the length value of the information is an information label).

Preceding the guide label and the length label are one or more MPLS forwarding labels; the guide label, the length label and the information label are followed by an MPLS service label for identifying a service type of the MPLS payload.

The MPLS forwarding label, the guide label and the MPLS service label each include a 3-bit Traffic Class (TC) and an 8-bit Time To Live (TTL).

All the labels in the MPLS label stack include a stack bottom identifier S bit, wherein only the S bit of the last MPLS service label is set to 1 to indicate that the label is located at the stack bottom of the MPLS label stack, while the S bits of all the other MPLS labels are set to 0.

TABLE 1

MPLS packet format in Example 1

| | | | |
|---|---|---|---|
| MPLS forwarding label 1 | TC | S | TTL |
| MPLS forwarding label 2 | TC | S | TTL |
| . . . | | | |
| MPLS forwarding label N | TC | S | TTL |
| guide label = 10 | TC | S | TTL |
| length = an information label | | S | label |
| information type = Alternate Marking type | | S | in-situ flow information telemetry information of Alternate Marking type |
| MPLS service label | TC | S | TTL |
| MPLS payload | | | |

In step A102, after receiving the MPLS packet carrying the in-situ flow information telemetry information, the intermediate forwarding node performs parsing based on the guide label, the length label and the information types in the information label in the MPLS label stack to obtain the in-situ flow information telemetry information of the Alternate Marking type having a fixed length in the information label, to complete the in-situ flow information telemetry of the Alternate Marking type.

The intermediate forwarding node finds the guide label with a value of 10 by scanning the MPLS label stack, then determines the length of the in-situ flow information telemetry information based on the length label directly following the guide label, determines, based on the type field in the information label directly following the length label, that the in-situ flow information telemetry information is 23-bit in-situ flow information telemetry information of the Alternate Marking type, and finally extracts the 23-bit in-situ flow information telemetry information of the Alternate Marking type in the information label, to complete the in-situ flow information telemetry of the Alternate Marking type.

In step A103, after receiving the MPLS packet carrying the in-situ flow information telemetry information, the decapsualtion node first completes the in-situ flow information telemetry of the Alternate Marking type, and then completes removal of the guide label, the length label and the information label.

The decapsulation node first completes the in-situ flow information telemetry of the Alternate Marking type in a similar way to the intermediate forwarding node, then determines the positions and the number of the information labels based on the guide label and the length label, and removes the guide label, the length label and the information labels from the MPLS packet.

Example 2

As a specific example of the embodiments of the present disclosure, an in-situ flow information telemetry method according to Example 2 of the present disclosure may include the following steps A201 through A203.

In step A201, the encapsulation node adds in-situ flow information telemetry information of an In situ Operations, Administration, and Maintenance type having a fixed length into the MPLS label stack of the MPLS packet, and uses the guide label, the length label and an information type in the information label to indicate in-situ flow information telemetry information of the In situ Operations, Administration, and Maintenance type having a fixed length in the information label.

In this example, as shown in Table 2, the MPLS packet includes two portions, namely an MPLS label stack and an MPLS payload.

The MPLS label stack consists of a set of 32-bit MPLS labels.

Wherein, the information type and the in-situ flow information telemetry information of the In situ Operations, Administration, and Maintenance type form two MPLS labels (also referred to as information label), wherein an 8-bit information type in a first information label (i.e., a first telemetry information label) is used to indicate that the following is 40-bit in-situ flow information telemetry information (i.e., telemetry information) of the In situ Operations, Administration, and Maintenance type. Since 40 bits exceed the remaining space of the first information label, only a part (i.e., first telemetry information) of the in-situ flow information telemetry information of the In situ Operations, Administration, and Maintenance type is included in the remaining space of the first information label; the second information label (i.e., second telemetry information label) only contains the remaining part (i.e. second telemetry information) of the in-situ flow information telemetry information of the In situ Operations, Administration, and Maintenance type, without information type.

The two MPLS labels preceding the two information labels are a guide label and a length label, respectively.

The value 10 of the first 20 bits of the guide label is a special MPLS label value, which is used to indicate that the following are a length label and one or more information labels. The length label has a length value to indicate a length of the following information (in this example, the length value of the information is two information labels).

Preceding the guide label and the length label are one or more MPLS forwarding labels; the guide label, the length label and the two information labels are followed by an MPLS service label for identifying a service type of the MPLS payload.

The MPLS forwarding label, the guide label and the MPLS service label each include a 3-bit TC and an 8-bit TTL.

All the labels in the MPLS label stack include a stack bottom identifier S bit, wherein only the S bit of the last MPLS service label is set to 1 to indicate that the label is located at the stack bottom of the MPLS label stack, while the S bits of all the other MPLS labels are set to 0.

TABLE 2

MPLS packet format in Example 2

| | | | |
|---|---|---|---|
| MPLS forwarding label 1 | TC | S | TTL |
| MPLS forwarding label 2 | TC | S | TTL |
| . . . | | | |
| MPLS forwarding label N | TC | S | TTL |
| guide label = 10 | TC | S | TTL |
| length = two information labels | | S | label |
| information type = In situ Operations, Administration, and Maintenance type | | S | in-situ flow information telemetry information of In situ Operations, Administration, and Maintenance type |
| in-situ flow information telemetry information of In situ Operations, Administration, and Maintenance type | | S | in-situ flow information telemetry information of In situ Operations, Administration, and Maintenance type |
| MPLS service label | TC | S | TTL |
| MPLS payload | | | |

In step A202, after receiving the MPLS packet carrying the in-situ flow information telemetry information, the intermediate forwarding node performs parsing based on the guide label, the length label and the information types in the first information label in the MPLS label stack to obtain the in-situ flow information telemetry information of the In situ Operations, Administration, and Maintenance type having a fixed length in the two information labels, to complete the in-situ flow information telemetry of the In situ Operations, Administration, and Maintenance type.

The intermediate forwarding node finds the guide label with a value of 10 by scanning the MPLS label stack, determines the length of the in-situ flow information telemetry information based on the length label directly following the guide label, determines, based on the type field in the information label directly following the length label, that the in-situ flow information telemetry information is 40-bit in-situ flow information telemetry information of the In situ Operations, Administration, and Maintenance type, and finally extracts the 40-bit in-situ flow information telemetry information of the In situ Operations, Administration, and Maintenance type in the two information labels, to complete the in-situ flow information telemetry of the In situ Operations, Administration, and Maintenance type.

In step A203, after receiving the MPLS packet carrying the in-situ flow information telemetry information, the decapsualtion node first completes the in-situ flow information telemetry of the In situ Operations, Administration, and Maintenance type, and then completes removal of the guide label, the length label and the information label.

The decapsulation node first completes the in-situ flow information telemetry of the In situ Operations, Administration, and Maintenance type in a similar way to the intermediate forwarding node, then determines the positions and the number of the information labels based on the guide label and the length label, and removes the guide label, the length label and the information labels from the MPLS packet.

Example 3

As a specific example of the embodiments of the present disclosure, an in-situ flow information telemetry method according to Example 3 of the present disclosure may include the following steps A301 through A303.

In step A301, the encapsulation node adds in-situ flow information telemetry information of an Alternate Marking type and in-situ flow information telemetry information of an In situ Operations, Administration, and Maintenance type having a fixed length into the MPLS label stack of the MPLS packet, and uses the guide label, the length label and an information type in the information label to indicate in-situ flow information telemetry information of the Alternate Marking type and in-situ flow information telemetry information of the In situ Operations, Administration, and Maintenance type each having a fixed length in the information label.

In this example, as shown in Table 3, the MPLS packet includes two portions, namely an MPLS label stack and an MPLS payload.

The MPLS label stack consists of a set of 32-bit MPLS labels.

Wherein, the information type and the in-situ flow information telemetry information of the Alternate Marking type form an MPLS label (also referred to as information label), wherein an 8-bit information type is used to indicate that the following is 23-bit in-situ flow information telemetry information of the Alternate Marking type, and the 23 bits includes 15 bits in the preceding, and 8 bits in the following (with an S bit inserted therebetween).

Wherein, the information type and the in-situ flow information telemetry information of the In situ Operations, Administration, and Maintenance type form two MPLS labels (also referred to as information label), wherein an 8-bit information type in a first information label (i.e., a second information label in the total) is used to indicate that the following is 40-bit in-situ flow information telemetry information of the In situ Operations, Administration, and Maintenance type, the 40-bit in-situ flow information telemetry information of the In situ Operations, Administration, and Maintenance type is distributed in the first information label and a second information label (i.e., a third information label in the total), and the second information label does not contain the information type.

The two MPLS labels preceding the three information labels are a guide label and a length label, respectively.

The value 10 of the first 20 bits of the guide label is a special MPLS label value, which is used to indicate that the following are a length label and one or more information labels. The length label has a length value to indicate a length of the following information (in this example, the length value of the information is three information labels).

Preceding the guide label and the length label are one or more MPLS forwarding labels; the guide label, the length label and the three information labels are followed by an MPLS service label for identifying a service type of the MPLS payload.

The MPLS forwarding label, the guide label and the MPLS service label each include a 3-bit TC and an 8-bit TTL.

All the labels in the MPLS label stack include a stack bottom identifier S bit, wherein only the S bit of the last MPLS service label is set to 1 to indicate that the label is located at the stack bottom of the MPLS label stack, while the S bits of all the other MPLS labels are set to 0.

TABLE 3

MPLS packet format in Example 3

| | | | |
|---|---|---|---|
| MPLS forwarding label 1 | TC | S | TTL |
| MPLS forwarding label 2 | TC | S | TTL |
| | . . . | | |
| MPLS forwarding label N | TC | S | TTL |
| guide label = 10 | TC | S | TTL |
| length = three information labels | | S | label |
| information type = Alternate Marking type | | S | in-situ flow information telemetry information of Alternate Marking type |
| information type = In situ Operations, Administration, and Maintenance type | | S | in-situ flow information telemetry information of In situ Operations, Administration, and Maintenance type |
| in-situ flow information telemetry information of In situ Operations, Administration, and Maintenance type | | S | in-situ flow information telemetry information of In situ Operations, Administration, and Maintenance type |
| MPLS service label | TC | S | TTL |
| MPLS payload | | | |

In step A302, after receiving the MPLS packet carrying the in-situ flow information telemetry information, the intermediate forwarding node performs parsing based on the guide label in the MPLS label stack, the information type in the first information label and the information type in the second information label to obtain the in-situ flow information telemetry information of the Alternate Marking type and the in-situ flow information of the In situ Operations, Administration, and Maintenance type each having a fixed length in the three information labels, to complete the in-situ flow information telemetry of the Alternate Marking type and the in-situ flow information telemetry of the In situ Operations, Administration, and Maintenance type.

The intermediate forwarding node finds the guide label with a value of 10 by scanning the MPLS label stack, determines the total length of the information label based on the length label of the guide label, then determines, based on the type field in the first information label directly following the length label, that a first type of the in-situ flow information telemetry information is 23-bit in-situ flow information telemetry information of the Alternate Marking type (which is carried by an information label), further determines, based on the type field in the information label directly following the first information label, that a second type of the in-situ flow information telemetry information is 40-bit in-situ flow information telemetry information of the In situ Operations, Administration, and Maintenance type (carried by the two information labels), to complete the in-situ flow information telemetry of the In situ Operations, Administration, and Maintenance type.

In step A303, after receiving the MPLS packet carrying the in-situ flow information telemetry information, the decapsualtion node first completes the in-situ flow information telemetry of the In situ Operations, Administration, and Maintenance type, and then completes removal of the guide label, the length label and the information label.

The decapsulation node first completes the in-situ flow information telemetry of the Alternate Marking type and the in-situ information telemetry of the In situ Operations, Administration, and Maintenance type in a similar way to the intermediate forwarding node, then determines the positions and the number of the information labels based on the guide label and the length label, and removes the guide label, the length label and the information labels from the MPLS packet.

Example 4

As a specific example of the embodiments of the present disclosure, an in-situ flow information telemetry method according to Example 4 of the present disclosure may include the following steps A401 through A403.

In step A401, the encapsulation node adds in-situ flow information telemetry information of an Alternate Marking type and in-situ flow information telemetry information of an In situ Operations, Administration, and Maintenance type having a fixed length into the MPLS stack of the MPLS packet, and uses the guide label, the length label and an information type in the information label to indicate in-situ flow information telemetry information of the Alternate Marking type and in-situ flow information telemetry information of the In situ Operations, Administration, and Maintenance type each having a fixed length in the information label; moreover, the encapsulation node adds in-situ flow information telemetry information of the In situ Operations, Administration, and Maintenance type having a variable length into the MPLS extension header of the MPLS packet, and an MPLS telemetry extension header indication (i.e., a telemetry extension header identifier) in the length label is used to indicate a presence of an MPLS telemetry extension header (i.e., a telemetry extension header).

As shown in Table 4, the MPLS packet includes three portions, namely an MPLS label stack, an MPLS extension header, and an MPLS payload.

The MPLS label stack consists of a set of 32-bit MPLS labels.

Wherein, the information type and the in-situ flow information telemetry information of the Alternate Marking type form an MPLS label (also referred to as information label), wherein an 8-bit information type is used to indicate that the following is 23-bit in-situ flow information telemetry information of the Alternate Marking type, and the 23 bits includes 15 bits in the preceding, and 8 bits in the following (with an S bit inserted therebetween).

Wherein, the information type and the in-situ flow information telemetry information of the In situ Operations, Administration, and Maintenance type form two MPLS labels (also referred to as information label), wherein an 8-bit information type in a first information label (i.e., a second information label in the total) is used to indicate that the following is 40-bit in-situ flow information telemetry information of the In situ Operations, Administration, and Maintenance type, the 40-bit in-situ flow information telemetry information of the In situ Operations, Administration, and Maintenance type is distributed in the first information label and a second information label (i.e., a third information label in the total), and the second information label does not contain the information type.

The two MPLS labels preceding the three information labels are a guide label and a length label, respectively.

The value 10 of the first 20 bits of the guide label is a special MPLS label value, which is used to indicate that the following are a length label and one or more information labels.

The length label has a length value for indicating a length of the following information (in this example, the length value of the information is three information labels), and an MPLS telemetry extension header indication bit (i.e., a length label carrying an MPLS telemetry extension header indication) for indicating a presence of an MPLS extension header, wherein the MPLS extension header includes an MPLS telemetry extension header.

Preceding the guide label and the length label are one or more MPLS forwarding labels; the guide label, the length label and the three information labels are followed by an MPLS service label for identifying a service type of the MPLS payload.

The MPLS forwarding label, the guide label and the MPLS service label each include a 3-bit TC and an 8-bit TTL.

The MPLS extension header portion is followed by the MPLS extension header portion, wherein the MPLS extension header includes an MPLS telemetry extension header that carries in-situ flow information telemetry information of an In situ Operations, Administration, and Maintenance type having a variable length.

Of course, at the front of the MPLS extension header portion, there may be a head of the MPLS extension header, and in addition to the MPLS telemetry extension header, other MPLS extension headers may also be included.

TABLE 4

| MPLS packet format in Example 4 | | | |
|---|---|---|---|
| MPLS forwarding label 1 | TC | S | TTL |
| MPLS forwarding label 2 | TC | S | TTL |
| | . . . | | |
| MPLS forwarding label N | TC | S | TTL |
| guide label = 10 | TC | S | TTL |
| length = three information labels; MPLS telemetry extension header indication bit | | S | label |
| information type = Alternate Marking type | | S | in-situ flow information telemetry information of Alternate Marking type |
| information type = In situ Operations, Administration, and Maintenance type | | S | in-situ flow information telemetry information of In situ Operations, Administration, and Maintenance type |
| in-situ flow information telemetry information of In situ Operations, Administration, and Maintenance type | | S | in-situ flow information telemetry information of In situ Operations, Administration, and Maintenance type |
| MPLS service label | TC | S | TTL |
| head of MPLS extension header | | | |
| MPLS telemetry extension header (MPLS extension header 1): in-situ flow information telemetry information of In situ Operations, Administration, and Maintenance type having a variable length | | | |
| MPLS extension header 2 | | | |
| . . . | | | |
| MPLS extension header N | | | |
| MPLS payload | | | |

In step A402, after receiving the MPLS packet carrying the in-situ flow information telemetry information, the intermediate forwarding node performs parsing based on the guide label in the MPLS label stack, the length label carrying the MPLS telemetry extension header indication, the information type in the first information label and the information type in the second information label to obtain the in-situ flow information telemetry information of the Alternate Marking type and the in-situ flow information of the In situ Operations, Administration, and Maintenance type each having a fixed length in the three information labels, as well as the in-situ flow information of the In situ Operations, Administration, and Maintenance type having a variable length in the MPLS telemetry extension header, so as to complete the in-situ flow information telemetry of the Alternate Marking type and the in-situ flow information telemetry of the In situ Operations, Administration, and Maintenance type.

The intermediate forwarding node finds the guide label with a value of 10 by scanning the MPLS label stack, determines the total length of the information label in the MPLS label stack and a presence of an MPLS telemetry extension header based on the length label carrying the MPLS telemetry extension header indication and directly following the guide label, then determines, based on the type field in the first information label directly following the length label, that a first type of the in-situ flow information telemetry information is 23-bit in-situ flow information telemetry information of the Alternate Marking type (which is carried by an information label), further determines, based on the type field in the information label directly following the first information label, that a second type of the in-situ flow information telemetry information is 40-bit in-situ flow information telemetry information of the In situ Operations, Administration, and Maintenance type (carried by two information labels), subsequently extracts 23 bits of in-situ flow information telemetry information of the Alternate Marking type and 40 bits of in-situ flow information telemetry information of the In situ Operations, Administration, and Maintenance type in the three information labels, and finally extracts in-situ flow information telemetry information of the In situ Operations, Administration, and Maintenance type by parsing the MPLS extension header, to complete the in-situ flow information telemetry of the In situ Operations, Administration, and Maintenance type.

In step A403, after receiving the MPLS packet carrying the in-situ flow information telemetry information, the decapsualtion node first completes the in-situ flow information telemetry of the Alternate Marking type and the in-situ flow information telemetry of the In situ Operations, Administration, and Maintenance type, and then completes removal of the guide label, the length label, the information label and the MPLS extension header.

The decapsulation node first completes the in-situ flow information telemetry of the Alternate Marking type and the in-situ information telemetry of the In situ Operations, Administration, and Maintenance type in a similar way to the intermediate forwarding node, then determines the positions and the number of the information labels based on the guide label and the length label carrying the MPLS telemetry extension header indication, and removes the guide label, the length label, the information label and the MPLS extension header from the MPLS packet.

Figure 6:
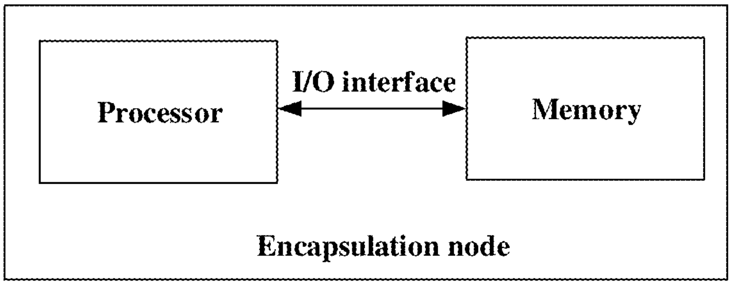
FIG. 6 illustrates a block diagram of an apparatus composition of an encapsulation node in an MPLS network according to embodiments of the present disclosure.

In a third aspect, referring to FIG. 6, the embodiments of the present disclosure provide an encapsulation node for use in an MPLS network, including: one or more memories, and one or more processors, wherein the memory(ies) stores a computer program executable by the processor(s), and the in-situ flow information telemetry method according to any one of the embodiments of the present disclosure is implemented when the computer program is executed by the processor(s).

Figure 7:
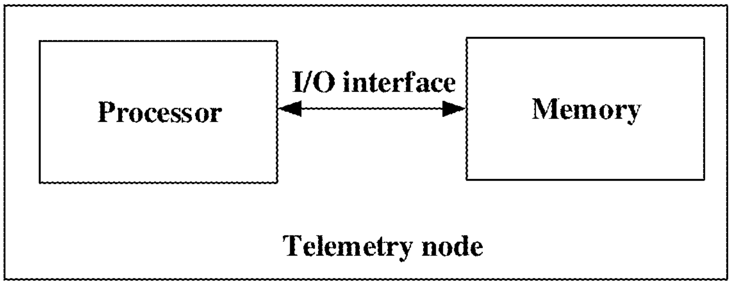
FIG. 7 illustrates a block diagram of an apparatus composition of a telemetry node in an MPLS network according to embodiments of the present disclosure.

In a fourth aspect, referring to FIG. 7, the embodiments of the present disclosure provide a telemetry node for use in an MPLS network, including: one or more memories, and one or more processors, wherein the memory(ies) stores a computer program executable by the processor(s), and the in-situ flow information telemetry method according to any one of the embodiments of the present disclosure is implemented when the computer program is executed by the processor(s).

Figure 8:
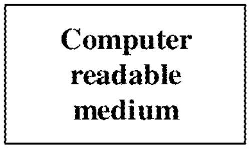
FIG. 8 illustrates a block diagram of a composition of a computer readable medium according to embodiments of the present disclosure.

In a fifth aspect, referring to FIG. 8, the embodiments of the present disclosure provide a computer readable medium having a computer program stored thereon, wherein the in-situ flow information telemetry method according to any one of the embodiments of the present disclosure is implemented when the computer program is executed by a processor.

Wherein, the processor is a component with a data processing capability, including, but not limited to, a Central Processing Unit (CPU). The memory is a component with a data storage capability, including, but not limited to, a Random Access Memory (RAM, more specifically a SDRAM, DDR, and the like), a Read-Only Memory (ROM), an Electrically Erasable Programmable Read-Only Memory (EEPROM), and a flash memory. The I/O (input/output) interface is coupled between the processor and the memory, to implement the information interaction between the processor and the memory, which includes, but is not limit to, a data bus.

It would be appreciated by those of skill in the art that the functional modules/units in all or some of the steps, systems and the devices disclosed above may be implemented as software, firmware, hardware, or suitable combinations thereof.

In a hardware implementation, the division between the functional modules/units described above does not necessarily correspond to the division of physical components; for example, one physical component may have a plurality of functions, or one function or operation may be performed through cooperation of several physical components.

Some or all of the physical components may be implemented as software executed by a processor, such as a Central Processing Unit (CPU), a digital signal processor or a microprocessor, or may be implemented as hardware, or may be implemented as an integrated circuit, such as an application specific integrated circuit. Such software may be distributed on a computer-readable medium, which may include a computer storage medium (or a non-transitory medium) and a communication medium (or a transitory medium). As well known by those of ordinary skill in the art, the term "computer storage medium" includes volatile/nonvolatile and removable/non-removable media used in any method or technology for storing information (such as computer-readable instructions, data structures, program modules and other data). The computer storage medium includes, but is not limited to, a Random Access Memory (RAM, more specifically a SDRAM, DDR, and the like), a Read-Only Memory (ROM), an Electrically Erasable Programmable Read-Only Memory (EEPROM), a flash memory or other memory techniques, a Compact Disc Read Only Memory (CD-ROM), a Digital Versatile Disc (DVD) or other optical discs, a magnetic cassette, a magnetic tape, a magnetic disk or other magnetic storage devices, or any other medium which can be configured to store desired information and can be accessed by a computer. In addition, it is well known by those of ordinary skill in the art that the communication media generally include computer-readable instructions, data structures, program modules, or other data in modulated data signals such as carrier wave or other transmission mechanism, and may include any information delivery medium.

The present disclosure discloses exemplary embodiments using specific terms, but the terms are merely used and should be merely interpreted as having general illustrative meanings, rather than for the purpose of limitation. Unless expressly stated, it is apparent to those of ordinary skill in the art that features, characteristics and/or elements described in connection with a particular embodiment can be used alone or in combination with features, characteristics and/or elements described in connection with other embodiments. Therefore, it should be understood by those of ordinary skill in the art that various changes in the forms and the detail s can be made without departing from the scope of the present disclosure of the appended claims.

I claim:

1. A method of in-situ flow information telemetry for an encapsulation node in a Multi-Protocol Label Switching MPLS network, the method comprising:

encapsulating a telemetry indication label and a telemetry information label into a label stack of an MPLS packet;

wherein the telemetry indication label is used to indicate the telemetry information label in the label stack, the telemetry information label is used to indicate a telemetry type and telemetry information of in-situ flow information telemetry to be performed, wherein, the telemetry indication label and the telemetry information label are set consecutively;

the telemetry indication label comprises a guide label and a length label;

wherein the guide label comprises a guide identifier for indicating a presence of the telemetry information label in the label stack, and the length label comprises a length identifier for indicating a total length of the telemetry information label in the label stack.

2. The method of claim 1, wherein, the telemetry information label comprises a first telemetry information label;

the first telemetry information label comprises a type identifier and first telemetry information;

wherein the type identifier is used to indicate the telemetry type, and a length of the first telemetry information corresponds to the type identifier in the first telemetry information label.

3. The method of claim 2, wherein, the telemetry information label further comprises a second telemetry information label corresponding to at least a part of the first telemetry information label;

wherein the second telemetry information label is located after the first telemetry information label corresponding thereto, and the second telemetry information label comprises second telemetry information with a length corresponding to the type identifier in the first telemetry information label corresponding to the second telemetry information label.

4. The method of claim 1, wherein, the telemetry indication label further comprises a telemetry extension header identifier, wherein the telemetry extension header identifier is used for indicating that the MPLS packet comprises a telemetry information extension header that comprises additional telemetry information; and the method further comprises: adding the telemetry information extension header into an extension header of the MPLS packet.

5. The method of claim 4, wherein, the telemetry indication label and the telemetry information label are set consecutively, and the telemetry indication label comprises a guide label comprising a guide identifier for indicating a presence of the telemetry information label in the label stack, and a length label comprising a length identifier for identifying a total length of the telemetry information label in the label stack;

the telemetry extension header identifier is located in the length label.

6. A non-transitory computer readable medium having a computer program stored thereon, wherein the method of in-situ flow information telemetry of claim 1 is implemented when the computer program is executed by a processor.

7. A method of in-situ flow information telemetry for a telemetry node in a Multi-Protocol Label Switching (MPLS) network, the method comprising:

parsing a label stack of a received MPLS packet;

in response to the label stack comprising a telemetry indication label, determining a telemetry information label in the label stack based on the telemetry indication label, wherein the telemetry indication label is used to indicate the telemetry information label in the label stack, the telemetry information label is used to indicate a telemetry type and telemetry information of in-situ flow information telemetry to be performed;

determining, based on the telemetry information label, a telemetry type and telemetry information of in-situ flow information telemetry to be performed; and performing the in-situ flow information telemetry based on the telemetry type and the telemetry information, wherein, the telemetry indication label and the telemetry information label are set consecutively;

the telemetry indication label comprises a guide label and a length label;

wherein the guide label comprises a guide identifier for indicating a presence of the telemetry information label in the label stack, and the length label comprises a length identifier for indicating a total length of the telemetry information label in the label stack.

8. The method of claim 7, further comprising:

in response to the telemetry indication label further comprising a telemetry extension header identifier, parsing a telemetry information extension header to obtain additional telemetry information, wherein the telemetry extension header identifier is used to indicate that the MPLS packet comprises a telemetry information extension header comprising additional telemetry information;

wherein performing the in-situ flow information telemetry based on the telemetry type and the telemetry information comprises: performing the in-situ flow information telemetry based on the telemetry type, the telemetry information, and the additional telemetry information.

9. The method of claim 7, further comprising:

forwarding the MPLS packet.

10. The method of claim 7, further comprising:

removing the telemetry indication label and the telemetry information label from the MPLS packet.

11. The method of claim 7, wherein, the telemetry type comprises an Alternate Marking type, and/or an In situ Operations, Administration, and Maintenance type.

12. A computer readable medium having a computer program stored thereon, wherein the method of in-situ flow information telemetry of claim 7 is implemented when the computer program is executed by a processor.

13. An encapsulation node applied to a Multi-Protocol Label Switching (MPLS) network, comprising one or more memories and one or more processors, wherein the one or more memories store a computer program executable by the one or more processors to cause the one or more processors to implement operations of in-situ flow information telemetry, comprising:

encapsulating a telemetry indication label and a telemetry information label into a label stack of an MPLS packet;

wherein the telemetry indication label is used to indicate the telemetry information label in the label stack, the telemetry information label is used to indicate a telemetry type and telemetry information of in-situ flow information telemetry to be performed, wherein, the telemetry indication label and the telemetry information label are set consecutively;

the telemetry indication label comprises a guide label and a length label;

wherein the guide label comprises a guide identifier for indicating a presence of the telemetry information label in the label stack, and the length label comprises a length identifier for indicating a total length of the telemetry information label in the label stack.

14. The encapsulation node of claim 13, wherein, the telemetry information label comprises a first telemetry information label;

the first telemetry information label comprises a type identifier and first telemetry information;

wherein the type identifier is used to indicate the telemetry type, and a length of the first telemetry information corresponds to the type identifier in the first telemetry information label.

15. The encapsulation node of claim 14, wherein, the telemetry information label further comprises a second telemetry information label corresponding to at least a part of the first telemetry information label;

wherein the second telemetry information label is located after the first telemetry information label corresponding thereto, and the second telemetry information label comprises second telemetry information with a length corresponding to the type identifier in the first telemetry information label corresponding to the second telemetry information label.

16. The encapsulation node of claim 13, wherein, the telemetry indication label further comprises a telemetry extension header identifier, wherein the telemetry extension header identifier is used for indicating that the MPLS packet comprises a telemetry information extension header that comprises additional telemetry information; and the operations further comprise: adding the telemetry information extension header into an extension header of the MPLS packet.

17. The encapsulation node of claim 16, wherein, the telemetry indication label and the telemetry information label are set consecutively, and the telemetry indication label comprises a guide label comprising a guide identifier for indicating a presence of the telemetry information label in the label stack, and a length label comprising a length identifier for identifying a total length of the telemetry information label in the label stack;

the telemetry extension header identifier is located in the length label.

18. A telemetry node applied to a Multi-Protocol Label Switching (MPLS) network, comprising one or more memories and one or more processors, wherein the one or more memories store a computer program executable by the one or more processors causing implementation operations of in-situ flow information telemetry, comprising:

parsing a label stack of a received MPLS packet;

in response to the label stack comprising a telemetry indication label, determining a telemetry information label in the label stack based on the telemetry indication label, wherein the telemetry indication label is used to indicate the telemetry information label in the label stack, the telemetry information label is used to indicate a telemetry type and telemetry information of in-situ flow information telemetry to be performed;

determining, based on the telemetry information label, a telemetry type and telemetry information of in-situ flow information telemetry to be performed; and performing the in-situ flow information telemetry based on the telemetry type and the telemetry information, wherein, the telemetry indication label and the telemetry information label are set consecutively;

the telemetry indication label comprises a guide label and a length label;

wherein the guide label comprises a guide identifier for indicating a presence of the telemetry information label in the label stack, and the length label comprises a length identifier for indicating a total length of the telemetry information label in the label stack.

19. The telemetry node of claim 18, the operations further comprise:

in response to the telemetry indication label further comprising a telemetry extension header identifier, parsing a telemetry information extension header to obtain additional telemetry information, wherein the telemetry extension header identifier is used to indicate that the MPLS packet comprises a telemetry information extension header comprising additional telemetry information;

wherein performing the in-situ flow information telemetry based on the telemetry type and the telemetry information comprises: performing the in-situ flow information telemetry based on the telemetry type, the telemetry information, and the additional telemetry information.

20. The telemetry node of claim 18, the operations further comprise:

forwarding the MPLS packet.

21. The telemetry node of claim 18, the operations further comprise:

removing the telemetry indication label and the telemetry information label from the MPLS packet.

22. The telemetry node of claim 18, wherein, the telemetry type comprises an Alternate Marking type, and/or an In situ Operations, Administration, and Maintenance type.

* * * * *